United States Patent
Cole et al.

(10) Patent No.: US 11,960,282 B2
(45) Date of Patent: Apr. 16, 2024

(54) SYSTEMS AND METHODS FOR SERVICING A DATA CENTER USING AUTONOMOUS VEHICLE

(71) Applicant: ABB Schweiz AG, Baden (CH)

(72) Inventors: Gregory A. Cole, West Hartford, CT (US); Harshang Shah, Bloomfield, CT (US); William J. Eakins, Coventry, CT (US); Saumya Sharma, Albany, NY (US); Thomas A. Fuhlbrigge, Ellington, CT (US)

(73) Assignee: ABB Schweiz AG, Baden (CH)

( * ) Notice: Subject to any disclaimer, the term of this patent is extended or adjusted under 35 U.S.C. 154(b) by 242 days.

(21) Appl. No.: 17/141,397

(22) Filed: Jan. 5, 2021

(65) Prior Publication Data

US 2022/0214686 A1 Jul. 7, 2022

(51) Int. Cl.
*G05D 1/00* (2006.01)
*E05F 15/73* (2015.01)
*G01C 21/20* (2006.01)

(52) U.S. Cl.
CPC ........... *G05D 1/0088* (2013.01); *E05F 15/73* (2015.01); *G01C 21/206* (2013.01);
(Continued)

(58) Field of Classification Search
CPC .. G05D 1/0088; G05D 1/0212; G05D 1/0282; G05D 2201/0216; G05D 1/0214; E05F 15/73; G01C 21/206; E05Y 2400/45; E05Y 2400/664; E05Y 2900/11; H04W 4/021; H04W 4/80
(Continued)

(56) References Cited

U.S. PATENT DOCUMENTS 9,934,477 B1 * 4/2018 Hansen ............... G06F 11/0793
10,409,281 B1 9/2019 Garrett et al.
(Continued)

FOREIGN PATENT DOCUMENTS

WO WO 2019/094442 A1 5/2019

OTHER PUBLICATIONS

European Patent Office, International Search Report in International Patent Application No. PCT/IB2022/050043, 5 pp. (dated Apr. 22, 2022).
(Continued)

*Primary Examiner* — Vivek D Koppikar
*Assistant Examiner* — Dominick Mulder
(74) *Attorney, Agent, or Firm* — Leydig, Voit & Mayer, Ltd.

(57) ABSTRACT

A system for servicing a data center using an autonomous vehicle (AV) is provided. The system comprises the AV and the AV is configured to: receive a task to perform within the data center, wherein the data center comprises a plurality of servers associated with a plurality of enterprise organizations; navigate from an initial location within the data center to a new location within the data center along a path extending through a portion of the data center, the path being determined automatically; and while navigating the path and in response to encountering a movable barrier disposed along the path, performing a procedure to bypass the movable barrier such that the AV can continue navigating along the path.

21 Claims, 7 Drawing Sheets

(52) U.S. Cl.
CPC ........ *G05D 1/0212* (2013.01); *E05Y 2400/45* (2013.01); *E05Y 2400/664* (2013.01); *E05Y 2900/11* (2013.01)

(58) Field of Classification Search
USPC .......................................................... 701/25
See application file for complete search history.

(56) References Cited

U.S. PATENT DOCUMENTS

| | | | | |
|---|---|---|---|---|
| 11,052,541 | B1* | 7/2021 | Howard | G05D 1/0061 |
| 2005/0001712 | A1* | 1/2005 | Yarbrough | G06K 19/07739 |
| | | | | 340/5.82 |
| 2008/0009970 | A1* | 1/2008 | Bruemmer | G05D 1/0088 |
| | | | | 700/245 |
| 2008/0110093 | A1* | 5/2008 | Liles | E05F 15/74 |
| | | | | 49/506 |
| 2014/0148989 | A1* | 5/2014 | Ueda | G05D 1/02 |
| | | | | 701/23 |
| 2017/0247108 | A1* | 8/2017 | Ljubuncic | G08G 5/0069 |
| 2017/0285646 | A1* | 10/2017 | Connor | B60W 30/085 |
| 2017/0361465 | A1 | 12/2017 | Zevenbergen | |
| 2018/0188737 | A1* | 7/2018 | Won | G05D 1/0225 |
| 2018/0284789 | A1* | 10/2018 | Oguro | B60W 50/0097 |
| 2019/0001227 | A1* | 1/2019 | Bloemsma | A63G 21/04 |
| 2019/0026959 | A1* | 1/2019 | Wu | G06V 20/58 |
| 2019/0048648 | A1* | 2/2019 | Lickfelt | H04L 12/2829 |
| 2019/0179332 | A1* | 6/2019 | Cheng | G05D 1/0088 |
| 2020/0003003 | A1* | 1/2020 | Romero | G08B 3/10 |
| 2020/0048956 | A1* | 2/2020 | Göppert-Boenke | E06B 5/18 |
| 2020/0081439 | A1* | 3/2020 | Mukherjee | B25J 9/023 |
| 2020/0089237 | A1 | 3/2020 | Whitaker et al. | |
| 2020/0123854 | A1* | 4/2020 | Oh | E06B 11/022 |
| 2020/0218277 | A1* | 7/2020 | Cunningham | B60W 50/029 |
| 2020/0340826 | A1* | 10/2020 | Li | G01C 21/387 |
| 2020/0357129 | A1* | 11/2020 | Linder | G06T 17/205 |
| 2021/0100416 | A1* | 4/2021 | Choi | G05D 1/0214 |
| 2021/0110356 | A1* | 4/2021 | Hamakubo | G05B 23/0283 |
| 2021/0213972 | A1* | 7/2021 | Forsberg | G08G 1/165 |
| 2021/0214161 | A1* | 7/2021 | Stuhaug | B65G 1/0471 |
| 2021/0309363 | A1* | 10/2021 | Zhou | B65G 1/04 |
| 2022/0009099 | A1* | 1/2022 | Kim | G05D 1/024 |
| 2022/0081953 | A1* | 3/2022 | Leite | E05F 15/614 |
| 2022/0125255 | A1* | 4/2022 | Choi | G05D 1/0212 |
| 2022/0228419 | A1* | 7/2022 | Tiso | A01K 11/006 |
| 2023/0002156 | A1* | 1/2023 | Gjerdevik | G05B 19/41895 |
| 2023/0225576 | A1* | 7/2023 | Wu | A47L 9/2805 |
| | | | | 701/26 |

OTHER PUBLICATIONS

European Patent Office, Written Opinion in International Patent Application No. PCT/IB2022/050043, 7 pp. (dated Apr. 22, 2022).

* cited by examiner

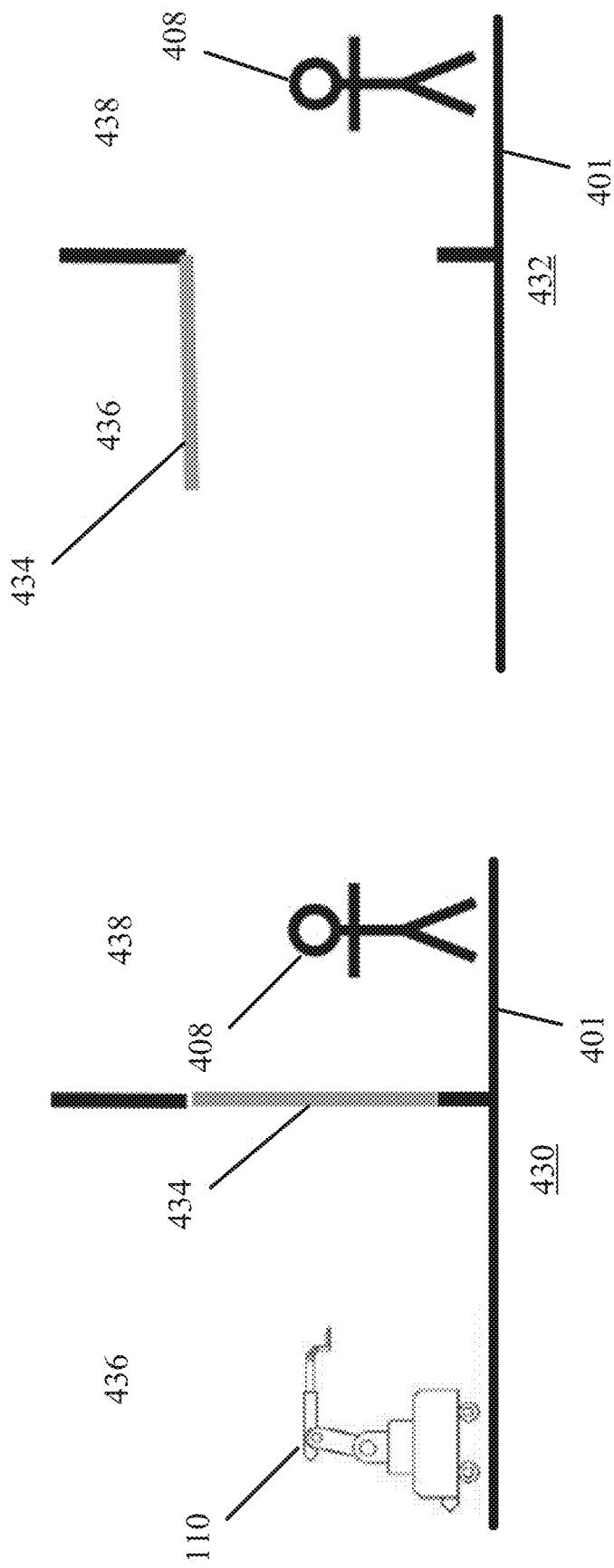

SYSTEMS AND METHODS FOR SERVICING A DATA CENTER USING AUTONOMOUS VEHICLE

FIELD

The present disclosure relates to autonomous vehicles and, more particularly, to systems and methods for operating an autonomous vehicle within a data center.

BACKGROUND

Autonomously guided vehicles (AVs) or self-driving vehicles are vehicles that are capable of navigating to a destination with little or no human control input. For example, there have been various attempts by numerous enterprise organizations to develop AVs for commercial use and/or as a replacement to traditional vehicles. However, certain environments may pose additional hazards and security risks to using AVs than others. For instance, different navigation techniques may be used by AVs when encountering different terrains such as open road, sand, or within a city environment.

Data centers are buildings or dedicated locations within one or more buildings that are used to house numerous computing systems, components, and/or equipment such as servers. Computing systems within a data center may be associated with many different enterprise organizations including enterprise organizations that are direct competitors to each other. As such, a key technical challenge for operating a data center is to provide data security for each enterprise organization's computing systems. Additionally, when the computing systems require maintenance, an enterprise organization may use a person to assist in repairing or replacing components of the computing systems. However, while one enterprise organization may trust the person (e.g., the person might be an employee of the enterprise organization), another enterprise organization, such as a direct competitor, might not trust that person to be within vicinity of their computing systems that may contain sensitive information.

SUMMARY

A first aspect of the present disclosure provides a system for servicing a data center using an autonomous vehicle (AV). The system comprises an AV that is configured to: receive a task to perform within the data center, wherein the data center comprises a plurality of servers associated with a plurality of enterprise organizations; navigate from an initial location within the data center to a new location within the data center along a path extending through a portion of the data center, the path being determined automatically; and while navigating the path and in response to encountering a movable barrier disposed along the path, performing a procedure to bypass the movable barrier such that the AV can continue navigating along the path.

According to an implementation of the first aspect, wherein the task is to service a server, from the plurality of servers, and wherein the new location within the data center is a location of the server within the data center.

According to an implementation of the first aspect, wherein the AV is configured to perform the procedure to bypass the movable barrier by placing the server within an opening of the movable barrier, and wherein the system further comprises: the movable barrier, wherein the movable barrier prevents any individual from entering a zone of the data center, and wherein the movable barrier is configured to: actuate the opening from a first position to a second position, wherein the server is accessible to an individual in the second position without the individual entering the zone.

According to an implementation of the first aspect, wherein the movable barrier is further configured to: receive a replacement server within the opening; and actuate the opening from the second position back to the first position, wherein the replacement server is accessible to the AV in the first position.

According to an implementation of the first aspect, wherein the movable barrier prevents any AVs from entering a zone of the data center, and wherein the AV is configured to perform the procedure to bypass the movable barrier by: determining a new path to the new location; and navigating the AV to the new location using the new path.

According to an implementation of the first aspect, wherein the AV is configured to perform the procedure to bypass the movable barrier by: providing, to a second device, identification information associated with the AV, and wherein the system further comprises: the movable barrier, wherein the movable barrier is located within a zone of the data center that is managed by an enterprise organization, wherein the movable barrier prevents unauthorized access to servers, from the plurality of servers, within the zone, and wherein the movable barrier is configured to: permit the AV access to the zone based on the identification information.

According to an implementation of the first aspect, wherein the system further comprises: the second device, wherein the second device is a local data center control system and configured to: receive the identification information associated with the AV; grant the AV access to the zone based on the identification information; and provide instructions to the movable barrier permitting the AV access to the zone.

According to an implementation of the first aspect, wherein the local data center control system is further configured to: log an amount of time the AV is within the zone based on a second movable barrier associated with the zone and providing instructions to the movable barrier permitting the AV access to the zone.

According to an implementation of the first aspect, wherein the second device is the movable barrier.

According to an implementation of the first aspect, wherein the AV is configured to navigate from the initial location to the new location based on: receiving information associated with one or more identifiers located within the data center; and comparing the one or more identifiers with identifier information in memory of the AV to determine a location of the AV within the data center.

According to an implementation of the first aspect, wherein the information associated with the one or more identifiers comprises a radio frequency (RF) signal and an identification image, and wherein the AV is configured to compare the one or more identifiers by comparing the RF signal and the identification image with RF signals and identification images in the memory.

According to an implementation of the first aspect, wherein the system further comprises: a server maintenance system operatively coupled to the AV, wherein the server maintenance system is configured to: in response to determining the AV is located at the location of the server to be serviced, retrieve the server from a server rack.

A second aspect of the present disclosure provides a method for servicing a data center using an autonomous vehicle (AV), comprising: receiving, by the AV, a task to perform within the data center, wherein the data center comprises a plurality of servers associated with a plurality of enterprise organizations; navigating, by the AV, from an initial location within the data center to a new location within the data center along a path extending through a portion of the data center, the path being determined automatically; and while navigating the path and in response to encountering a movable barrier disposed along the path, performing, by the AV, a procedure to bypass the movable barrier such that the AV can continue navigating along the path.

According to an implementation of the second aspect, wherein the task is to service a server, from the plurality of servers, and wherein the new location within the data center is a location of the server within the data center.

According to an implementation of the second aspect, wherein the movable barrier prevents any AVs from entering a zone of the data center, and wherein performing the procedure to bypass the movable barrier comprises: determining a new path to the new location; and navigating the AV to the new location using the new path.

According to an implementation of the second aspect, wherein performing the procedure to bypass the movable barrier comprises providing, by the AV and to a second device, identification information associated with the AV, wherein the movable barrier is located within a zone of the data center that is managed by an enterprise organization, wherein the movable barrier prevents unauthorized access to servers, from the plurality of servers, within the zone, and wherein the AV is granted access to the zone based on providing the identification information.

According to an implementation of the second aspect, the method further comprising: receiving, by the second device, the identification information associated with the AV; granting, by the second device, the AV access to the zone based on the identification information; and providing, by the second device, instructions to the movable barrier permitting the AV access to the zone.

According to an implementation of the second aspect, wherein the second device is a local data center control system, and wherein the method further comprises: logging, by the local data center control system, an amount of time the AV is within the zone based on a second movable barrier associated with the zone and providing instructions to the movable barrier permitting the AV access to the zone.

According to an implementation of the second aspect, wherein the second device is the movable barrier.

A third aspect of the present disclosure provides a non-transitory computer-readable medium having processor-executable instructions stored thereon. The processor-executable instructions, when executed by one or more controllers, facilitate: receiving a task to perform within a data center, wherein the data center comprises a plurality of servers associated with a plurality of enterprise organizations; navigating an AV from an initial location within the data center to a new location within the data center along a path extending through a portion of the data center, the path being determined automatically; and while navigating the path and in response to encountering a movable barrier disposed along the path, performing a procedure to bypass the movable barrier such that the AV can continue navigating along the path.

BRIEF DESCRIPTION OF THE DRAWINGS

Embodiments of the present disclosure will be described in even greater detail below based on the exemplary figures. The present disclosure is not limited to the exemplary embodiments. All features described and/or illustrated herein can be used alone or combined in different combinations in embodiments of the present disclosure. The features and advantages of various embodiments of the present disclosure will become apparent by reading the following detailed description with reference to the attached drawings which illustrate the following:

FIGS. 4a-4c depict exemplary movable barriers within the data center according to one or more embodiments of the present disclosure.

DETAILED DESCRIPTION

Figure 1:
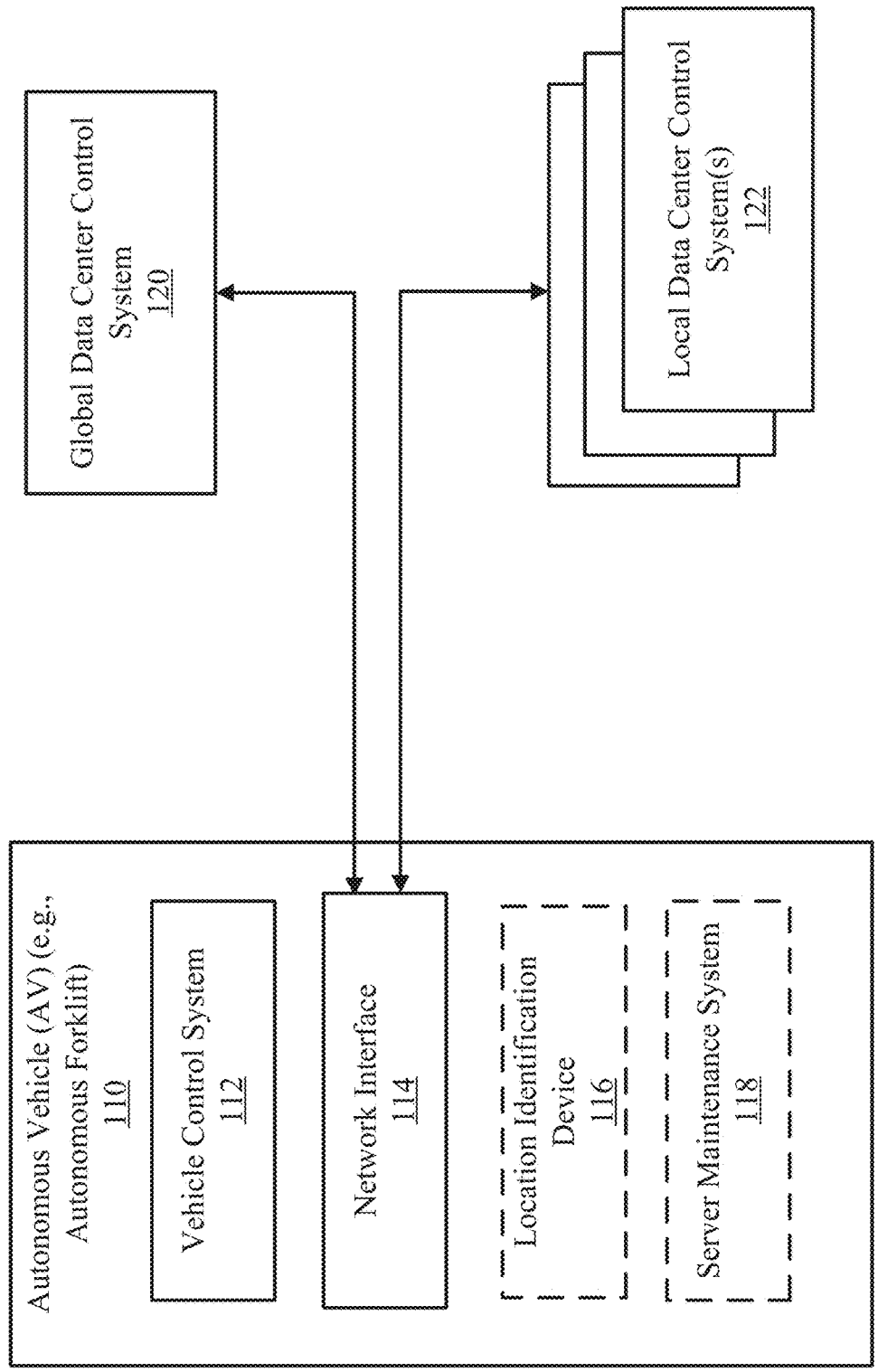
FIG. 1 illustrates a simplified block diagram depicting an autonomous vehicle within a data center environment according to one or more embodiments of the present disclosure.

One possible and secure solution for servicing data centers without human intervention is to use AVs to perform maintenance and repair tasks within the data centers. Using AVs in these environments provides its own unique challenges such as navigating across different zones or regions (e.g., people only zones, vehicle and people zones, vehicle only zones, zones with a competitor's computing systems, and so on).

The present disclosure describes servicing a data center using an autonomous vehicle (AV), which provides advantages over the state of the art. For example, the present disclosure provides methods and processes for navigating an AV within a data center environment including complying with rules, policies, and/or protocols as the AV enters different regions or zones of the data center environment. For example, the data center environment may house computing systems such as servers associated with many different enterprise organizations and each enterprise organization may have their own rules or policies for the AV. Furthermore, the data center environment may include regions or zones that have rules or policies indicating whether the region is only intended for people, only intended for robots/AVs, or is open to both robots/AVs and people. For instance, when entering a new region, the AV may encounter a movable barrier such as a door or entranceway. The AV may be required to provide its credentials or other identification information prior to being allowed to enter the region. Based on providing the proper identification information, a data center control system may be configured to lower the movable barrier and allow the AV access to the region. This and other examples of navigating the AV within a data center will be described in further detail below.

Exemplary aspects of servicing a data center using an AV, according to the present disclosure, are further elucidated below in connection with exemplary embodiments, as depicted in the figures. The exemplary embodiments illustrate some implementations of the present disclosure and are not intended to limit the scope of the present disclosure.

Throughout the drawings, identical reference numbers designate similar, but not necessarily identical, elements.

The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

Where possible, any terms expressed in the singular form herein are meant to also include the plural form and vice versa, unless explicitly stated otherwise. Also, as used herein, the term "a" and/or "an" shall mean "one or more" even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on".

FIG. 1 illustrates a simplified block diagram depicting an autonomous vehicle within a data center environment 100 according to one or more embodiments of the present disclosure.

Referring to FIG. 1, the data center environment 100 includes an autonomous vehicle (AV) 110 (e.g., an autonomous forklift or robot), a global data center control system 120, and local data center control system(s) 122. Among other components, systems, and/or entities such as an engine and/or transmission, which are not shown, the AV 110 includes a vehicle control system 112 and a network interface 114. In some examples, optionally, the AV 110 includes a location identification device 116 and/or a server maintenance system 118. The AV 110 may be an autonomous forklift, robot, or any other type of robotic device or system that is capable of navigating and servicing a data center.

The vehicle control system 112 may communicate with the network interface 114, the location identification device 116 and/or the server maintenance system 118 in order to navigate the AV 110 within the data center environment 100. For instance, the vehicle control system 112 may receive instructions from the global data center control system 120 via the network interface 114. The instructions may indicate for the AV 110 to move from a first location within the data center environment 100 to a second location. In transit between the first location to the second location, the AV 110 may encounter one or more movable barriers and/or enter or leave one or more zones. Each zone and/or movable barrier may be associated with different rules, policies, and/or other indications. For example, movable barriers (e.g., doors, entranceways, or doorways) may allow and/or permit access to certain regions, zones, or areas of the data center environment 100.

For instance, one zone of the data center environment 100 may be a break-room that is only accessible to people. The movable barrier may prevent AVs 110 from entering this area. Another zone may be a zone solely for the operation of AVs 110 (e.g., people are not allowed within this zone due to security, safety, or for other reasons). The movable barrier may permit AVs from entering the area, but might not allow people to enter. Another zone may be a zone that requires a credential to pass through. For instance, the instruction may be for the AV 110 to repair a server within the data center environment 100. To reach the server, the AV 110 may have to travel through a zone owned and/or operated by a particular enterprise organization. The enterprise organization may have their own rules or policies as to the people and machines (e.g., the AV 110) that may enter or move through their zone. As such, the enterprise organization may have movable barriers that permit entry based on the AV 110 providing their credentials. These examples will be described in further detail below.

The enterprise organization may be any type of corporation, company, organization, institution, or the like that is formed to pursue entrepreneurial endeavors such as by selling goods and/or by providing services. The data center environment 100 may include computing systems, devices, and/or equipment such as servers that are associated with numerous enterprise organizations. In other words, enterprise organizations, including direct competitors of each other, may own, operate, and/or manage servers and/or server racks within the same data center environment 100. For example, within the data center environment 100, multiple enterprise organizations may house their own servers/server racks. In some instances, these servers/server racks may store sensitive and/or confidential information about enterprise organization. As such, the enterprise organization may use movable barriers and/or other features to prevent other enterprise organizations (e.g., their direct competitors) from gaining access to their sensitive and/or confidential information.

The AV 110 receives and/or provides information to the global data center control system 120 and/or local data center control systems 122 using the network interface 114. The global data center control system 120 includes one or more computing devices, computing platforms, systems, servers, processors, memory, and/or other apparatuses capable of performing tasks, functions, and/or other actions for the data center environment 100. For example, the global data center control system 120 may receive one or more maintenance requests such as to replace a server within the data center environment 100. The global data center control system 120 may provide instructions to the AV 110 to perform the maintenance task (e.g., replace the server).

In addition to having a global data center control system 120, the data center environment 100 may further include one or more local data center control systems 122. For instance, each of the local data center control systems 122 may manage rules and/or policies for one or more zones, regions, or areas within the data center environment 100. For example, the data center environment 100 may be broken up into a plurality of zones or regions. A zone or region may include servers/server racks associated with a particular enterprise organization. A local data center control system 122 may be owned/managed by this enterprise organization and provide rules, policies, and/or conditions for a person and/or object (e.g., AV such as AV 110) to enter the zone. The AV 110 may enter the zone with the servers/server racks of the enterprise organization by providing information (e.g., identification information) to the local data center control system 122 that is in charge of the zone. By using the local center control system 122, the enterprise organization may provide more security to the sensitive and/or confidential information stored within the servers.

In some examples, the global data center control system 120 may provide access to one or more zones within the data center environment 100. For example, a smaller enterprise organization may own a few servers within the data center environment 100. As such, it might not make economic sense for this enterprise organization to have its own local data center control system 122. In such instances, the global data center control system 120 may perform the functions of the local data center control system 122 (e.g., allow an AV 110 to enter the zone with the servers).

In some instances, the AV 110 may include a location identification device 116. When present, the location identification device 116 may be used by the AV 110 to determine a location or position within the data center environment 100. For example, within the data center environment 100, there may be certain identifiers that the AV 110 may use to determine its location within the data center environment 100. For instance, the identifiers may be a wireless identifier such as a radio frequency (RF) identifier. The location identification device 116 may receive information from the identifier (e.g., RF identifier). Then, the AV 110 may use this information to determine a location within the data center environment 100. By using the identifiers within the environment 100, the AV 110 may be able to better navigate within the environment 100 to reach its destination.

For example, the environment 100 may include "zip codes" (e.g., zones or regions within the environment 100) defining a known size and shape. From the "zip code", an AV 110 may be able to determine localization. For instance, differentiated discrete landmarks (e.g., identifiers) may be disposed proximate the zones within the environment 100. The identifiers (e.g., landmarks such as 3-D fiducials) may be a cone, post, and so on, which may have a unique machine readable identifying label. From the identifiers, the AV 110 may define where the AV 110 is within the facility and specifically within the zone. Localization is a process to confirm where the AV 110 is placed within a 3-D environment without regard to the AV's pose. After completion of the localization process, the AV 110 may then proceed to localized registration. In other words, the AV 110 determines the zone one is located within, then a localization is determined based upon relationship known landmarks (identifiers) from the machine reading of the identifiers and finally registration. Furthermore, the identifiers may be used to confirm local robot sensor alignment. The identifiers may be on respective items and/or server racks. For instance, from an alignment perspective, the server rack may include specific features for localized registration.

In some examples, the AV 110 may include a server maintenance system 118. When present, the server maintenance system 118 may include one or more devices, robotic components, processors, and/or additional entities that are used to repair, replace, and/or perform maintenance on servers within the data center environment 100. For example, the server maintenance system 118 may be automated to pull or pick up a server from a server rack and replace the server with a new server. In some instances, the server maintenance system 118 may be part of the AV 110. In other instances, the server maintenance system 118 may be a separate device from the AV 110. In some variations, the server maintenance system 118 may unlock and undock the server to be repaired/replaced and pull the server out. At this point, the AV 110 may move to another location to drop off the server. By this using, the AV 110 may accomplish all gross navigation and delivery of different robotic payloads to different parts of the environment 100 for different tasks such as hard drive chain of custody, air filter replacement, and so on. In some instances, the server maintenance system 118 may locate the server to be repaired/replaced using optical registration (e.g., using fiducials and camera systems to create a registration to the manipulation systems coordinate frame), mechanical (e.g., the system 118 may include mechanical "docking" that will allow it to have a ground truth of its position with respect to its manipulation target), and/or optical reflective tracker (e.g., install targeting fiducials on the servers). After the system registration is performed, the system 118 may request the AV 110 to reposition itself if its position is not sufficiently accurate to access the target server. During the motion and manipulation to reach the server, the system 118 may constantly monitor the registration to ensure that the registration is within acceptable bounds, and may update motion plans accordingly.

Figure 2:
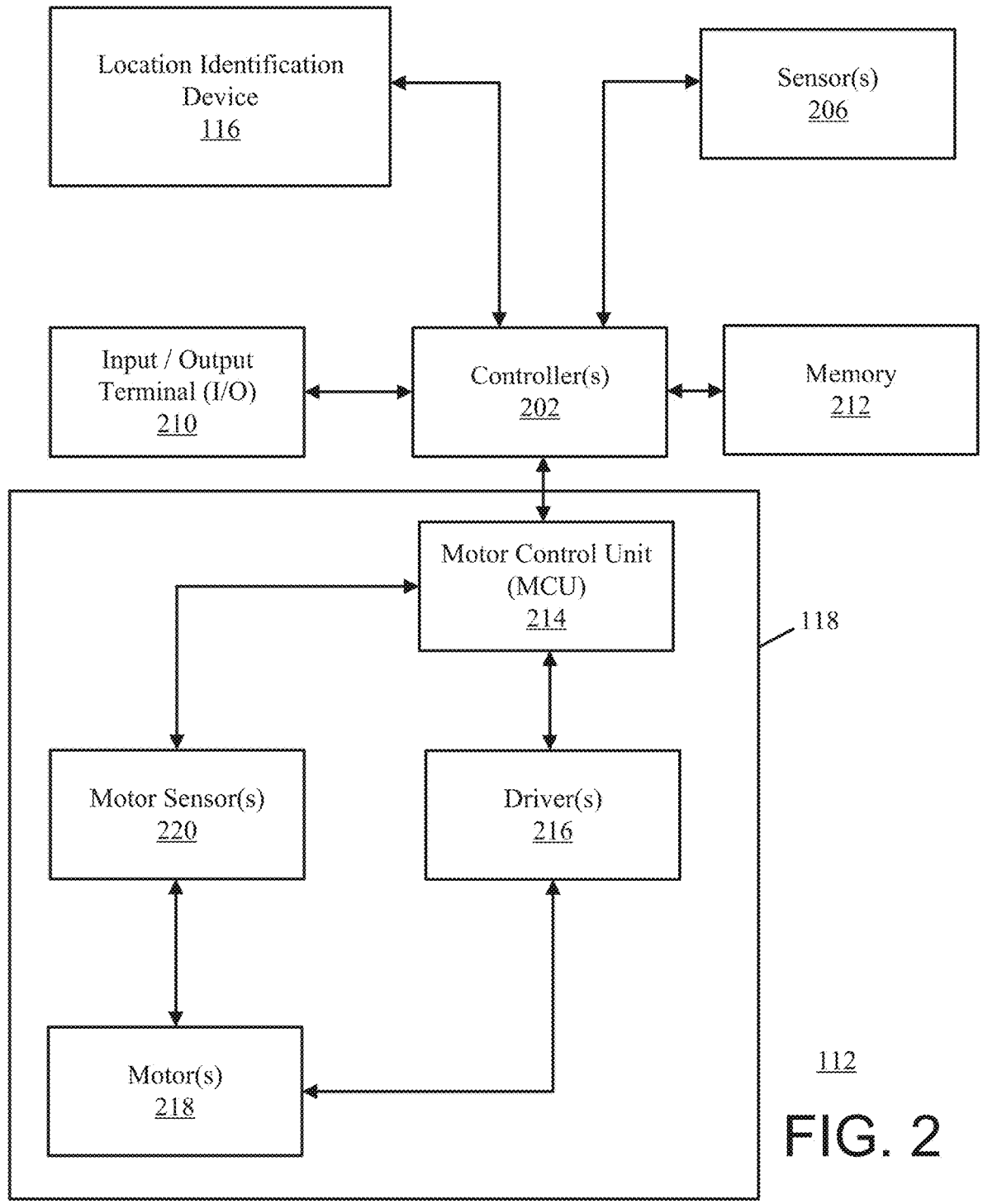
FIG. 2 is a schematic illustration of an exemplary control system according to one or more embodiments of the present disclosure.

FIG. 2 is a schematic illustration of an exemplary vehicle control system 112 according to one or more embodiments of the present disclosure. It will be appreciated that the vehicle control system shown in FIG. 2 is merely an example and additional/alternative embodiments of the control system 112 from environment 100 are contemplated within the scope of the present disclosure.

The vehicle control system 112 includes a controller 202. The controller 202 is not constrained to any particular hardware, and the controller's configuration may be implemented by any kind of programming (e.g., embedded Linux) or hardware design—or a combination of both. For instance, the controller 202 may be formed by a single processor, such as general purpose processor with the corresponding software implementing the described control operations. On the other hand, the controller 202 may be implemented by a specialized hardware, such as an ASIC (Application-Specific Integrated Circuit), an FPGA (Field-Programmable Gate Array), a DSP (Digital Signal Processor), or the like.

The controller 202 is in electrical communication with memory 212. The memory 212 may be and/or include a computer-usable or computer-readable medium such as, but not limited to, an electronic, magnetic, optical, electromagnetic, infrared, or semiconductor computer-readable medium. More specific examples (e.g., a non-exhaustive list) of the computer-readable medium may include the following: an electrical connection having one or more wires; a tangible medium such as a portable computer diskette, a hard disk, a time-dependent access memory (RAM), a ROM, an erasable programmable read-only memory (EPROM or Flash memory), a compact disc read-only memory (CD ROM), or other tangible optical or magnetic storage device. The memory 212 may store corresponding software such as computer-readable instructions (code, script, etc.). The computer instructions being such that, when executed by the controller 202, cause the controller 202 to control the control system 112 to provide for the operation of the AV 110 as described herein.

Sensors 206 may optionally be included within the vehicle control system 112. These sensors 206 may provide sensor information to the vehicle control system 112 in order to navigate the AV 110 within the data center environment 100 and/or perform one or more tasks (e.g., replacing a server). Examples of sensors that can be used include vision devices such as cameras, proximity sensors such as touch or touchless proximity sensors, light or radiation detection devices such as LIDAR, magnetic pickups sensing magnets, metals, painted shapes such as lane markers, or other fiducials embedded in the floor or walls of the surrounding environment, and others.

The vehicle control system 112 may include an input/output (I/O) terminal 210 for sending and receiving various input and output signals. For example, the vehicle control system 112 may send/receive external communication to a user via the I/O terminal 210. The control system 112 may further control a user feedback interface on the AV 110 via the I/O terminal 210 (or otherwise). The user may provide feedback using the user feedback interface. Additionally, and/or alternatively, the user feedback interface may display information to the user about the AV 110.

While not shown in FIG. 2, the controller 202 may communicate with other devices within the data center environment 100 using the network interface 114. For example, the controller 202 may receive instructions from the global data center control system 120. The instructions may indicate for the AV 110 to navigate to a new location and/or replace a server within the data center environment 100. The controller 202 may further communicate with the local data center control system 122. For example, the controller 202 may provide an access request to one or more zones managed by the local data center control system 122.

In some examples, the location identification device 116 and/or the server maintained system 118 may be included within the vehicle control system 112. However, as shown in FIG. 1 and described above, they may also be separate from the vehicle control system 112 and/or the AV 110 (e.g., the server maintenance system 118 may be separate from the AV 110).

When present, the location identification device 116 communicates with the controller 202 to determine a location of the AV 110 within the data center environment 100. For example, the location identification device 116 may receive information associated with an identifier and use the information to determine the location. In some instances, the location identification device 116 may use more than one modality to determine the location. For instance, the location identifier device may be and/or include an image capturing device (e.g., camera), a light detection and ranging (LIDAR) device, radio frequency (RF) or RF localization device, a radio frequency identification (RFID) device, and/or wireless receiver (e.g., WIFI, BLU-TOOTH). The location identification device 116 may receive information associated with the identifier such as a captured image from the image capturing device, a LIDAR signal from the LIDAR device, an RF from the RF/RF localization device, an RFID tag from the RFID device, and/or a wireless signal from the wireless receiver. After receiving the information, the location identification device 116 may provide the information to the controller 202. Then, based on the information, the controller 202 may determine a location within the data center environment 100.

When present, the server maintenance system 118 may include an MCU 214, one or more motor sensors 220, drivers 216, and/or motors 218. As mentioned above, the server maintenance system 118 may be used by the AV 110 to repair, replace, and/or perform maintenance on servers within the data center environment 100.

The vehicle control system 112 is configured to drive motors 218 of the server maintenance system 118. As used herein, motors 218 include AC motors, DC motors, gear-driven motors, linear motors, actuators, or any other electrically controllable device used to effect the kinematics of the server maintenance system 118. Accordingly, the control system 112 is configured to automatically and continually determine the physical state of the server maintenance system 118 and automatically control the various motors 218 to maneuver robotic components to repair, replace, and/or perform maintenance on the servers with the environment 100.

The vehicle control system 112 may further include a motor control unit (MCU) 214 (also referred to herein as a motor controller), e.g., as part of the controller 202 or a separate device. The MCU 214 controls motor drivers 216 using feedback from motor sensors 220 (e.g., encoders) in order to provide real time control of the motors 218. Accordingly, the MCU 214 receives instructions for controlling the motors 218 (e.g., receives motor/actuator control signals from the controller 202), and interprets those instructions, in conjunction with feedback signals from the motor sensors 220, to provide control signals to the motor drivers 216 for accurate and real-time control of the motors 218 (e.g., sends motor/actuator driver signals). The motor drivers 216 transform the control signals, as communicated by the MCU 214, into drive signals for driving the motors 218 (e.g., sends individual operation signals to the motors/actuators). In another embodiment, the MCU 314 is integrated with circuitry to directly control the motors 218.

The MCU 214 may be included as part of the controller 202 or a stand-alone processing system (e.g., a microprocessor). Accordingly, just like the controller 202, the MCU 214 is not constrained to any particular hardware, and the MCU's configuration may be implemented by any kind of programming or hardware design—or a combination of both.

Figure 3:
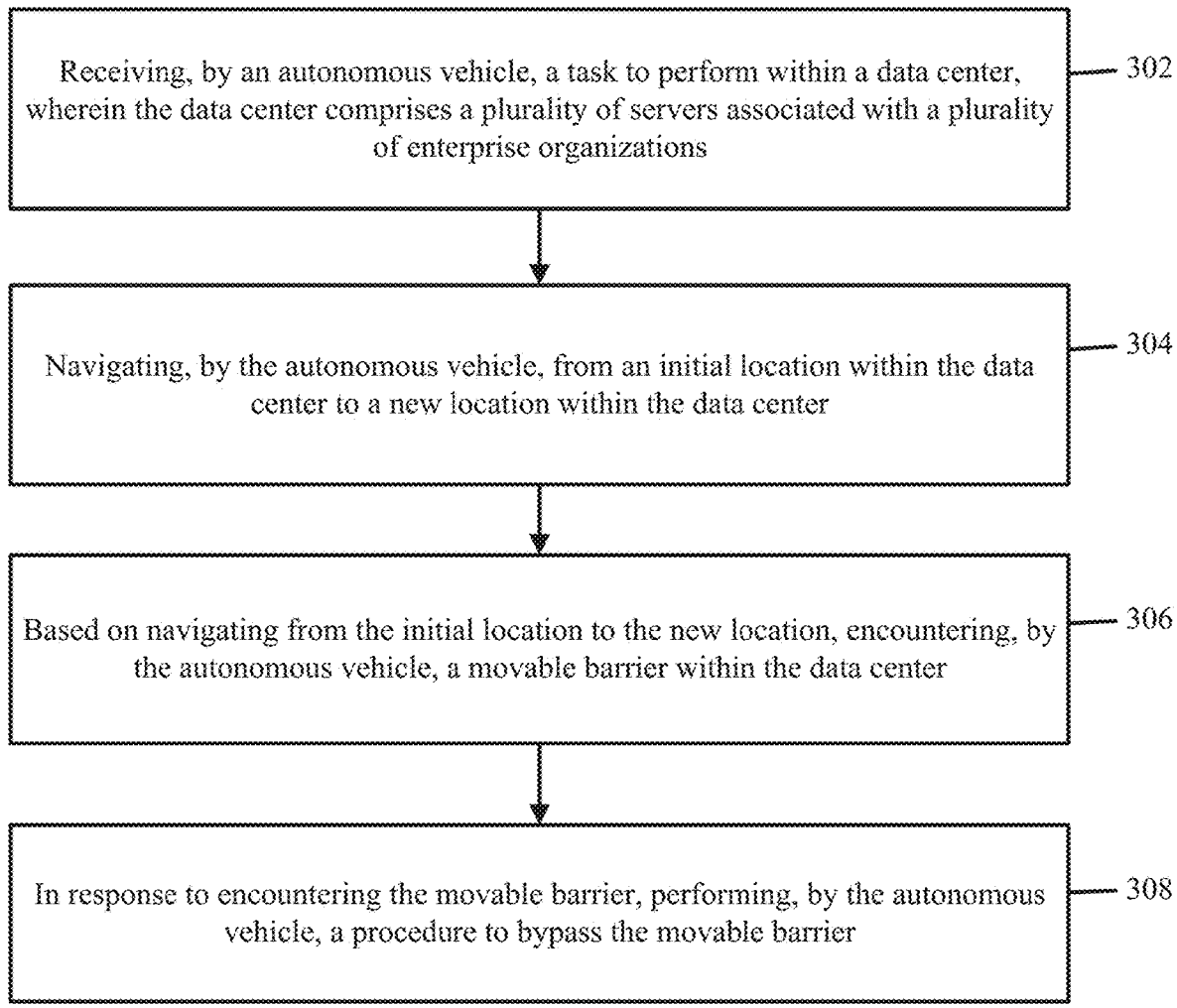
FIG. 3 illustrates a process for servicing a data center using an autonomous vehicle according to one or more embodiments of the present disclosure.

FIG. 3 illustrates a process 300 for servicing a data center environment 100 using an autonomous vehicle 110 according to one or more embodiments of the present disclosure. The process 300 may be performed by the control system 112 and in particular, the controller 202 shown in FIG. 2. However, it will be recognized that any of the following blocks may be performed in any suitable order and that the process 300 may be performed in any suitable data center environment and by any suitable controller or processor.

At block 302, the AV 110 receives a task to perform within the data center environment 100. The data center environment 100 includes numerous servers associated with many different enterprise organizations. For example, as mentioned above, the data center environment 100 may house numerous computing systems, components, and/or equipment such as servers. The servers may belong to many different enterprise organizations and each enterprise organization's servers may be located within a different region, zone, zip code, or location of the data center environment 100. The AV 110 may receive information from the global data center control system 120 and/or the local data center control system 122 indicating a task such as to fix a particular enterprise organization's server or to move to a new location within the data center environment 100.

At block 304, the AV 110 may navigate from an initial location within the data center environment 100 to a new location within the data center environment 100. For example, the received task may be to move to a new location within the data center environment 100. Based on the received task, the AV 110 may determine a path or route to the new location identified by the task. The determined path or route may include one or more movable barriers that prevent/restrict access to one or more zones. For example, the data center environment 100 may have numerous different zones or obstacles and the path determined by the AV 110 may seek to avoid and/or overcome these zones and/or obstacles. In some instances, the received task may be to replace a server for an enterprise organization. As such, the AV 110 may navigate from its current location (e.g., initial location) to the server's location (e.g., the new location).

At block 306, based on navigating from the initial location to the new location, the AV 110 may encounter a movable barrier within the data center environment 100. For example, while navigating to the new location, the AV 110 may encounter one or more obstacles such as movable barriers. The movable barriers may block and/or restrict access to zones within the data center environment 100. For example, certain zones may be for only AVs, certain zones may be for only people, and certain zones may be for both people and AVs. For instance, the data center environment 100 may include zones for only people such as break-rooms or walk-ways. The movable barriers may prevent AVs access within these zones, but may allow access for people. The data center environment 100 may further include zones for only AVs. For example, a zone in the data center environment 100 may include the servers that may store confidential and/or sensitive information for an enterprise organization. As such, the enterprise organization may seek to prevent people from gaining access to these servers by using movable barriers.

The data center environment 100 may further include zones that permit access for both AVs and people. For example, the data center environment 100 may include movable barriers that allow access to people and/or AVs based on the identification information for the AV or person. In other words, the movable barriers may permit/restrict access to a particular zone based on if a person has the proper credentials (e.g., the person is an employee of the enterprise organization that manages the zone/servers within the zone or the person is authorized to service the servers within the zone). Furthermore, the movable barriers may permit/restrict access based on the AVs providing proper identification.

The movable barrier may be any obstacle, barrier, or deterrent that prevents and/or permits access to a particular zone of the data center environment 100. For example, the movable barrier may be a door, access-way, or entrance-way.

In some instances, the movable barrier may include a hardware system and/or one or more computing devices/systems. For example, the AV 110 may use the network interface 114 to communicate with the movable barrier either directly or indirectly. Based on the communication, the movable barrier may permit the AV 110 to enter the zone or restrict the AV 110 from entering the zone.

At block 308, in response to encountering the movable barrier, the AV 110 may perform a procedure to bypass the movable barrier. For example, the movable barrier may permit/restrict access to a particular zone and the AV 110 may bypass the movable barrier by performing a procedure. In some instances, the procedure may include the AV 110 communicating with the movable barrier, the global data center control system 120, and/or the local data center control system 122 in order to bypass the movable barrier. For example, the AV 110 may provide identification information to the local data center control system 122 that manages the zone associated with the movable barrier. Based on the identification information, the movable barrier may move and grant the AV 110 access into the zone.

Figure 4A:
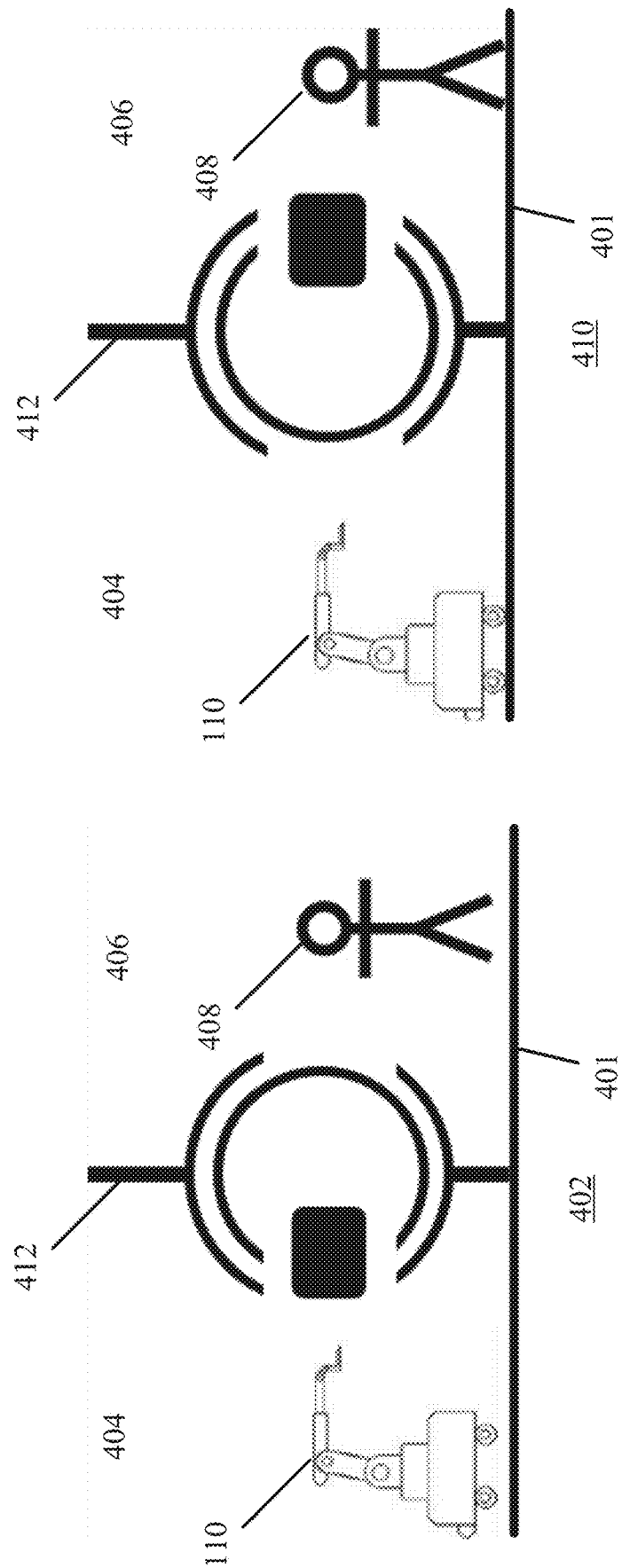
Figure 4B:
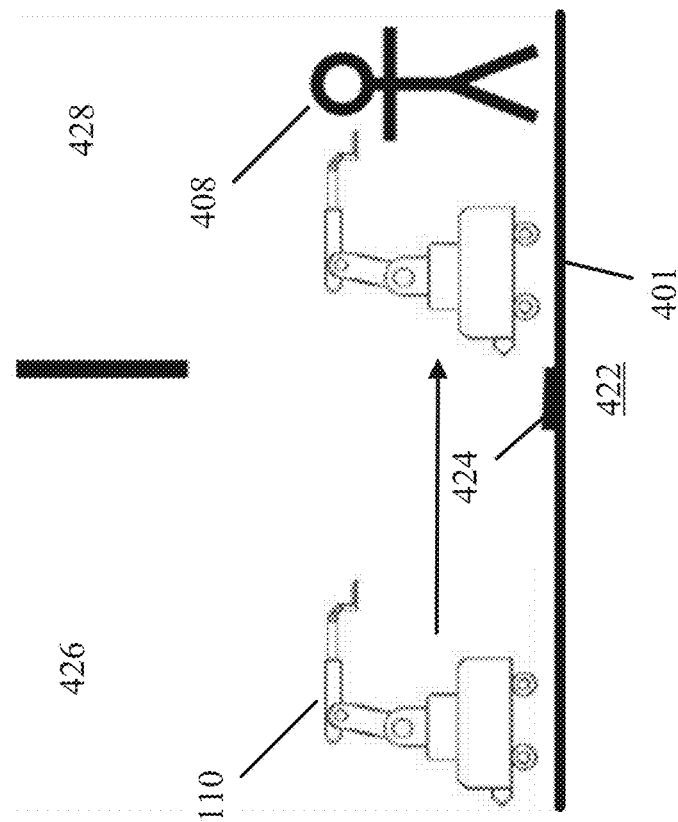
Figure 4B:
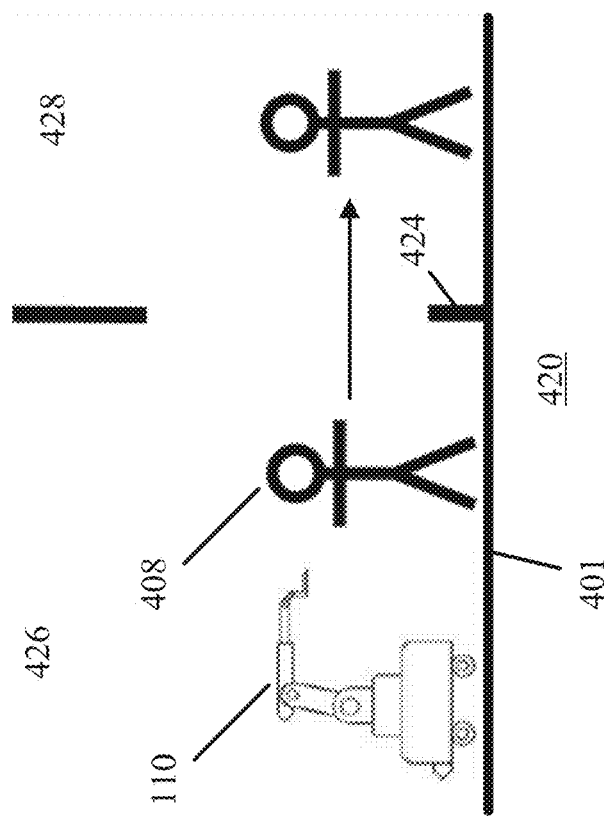

FIGS. 4a-4c shows exemplary movable barriers within the data center environment 100 and will be used to describe blocks 306 and 308 in more detail. Each of the scenarios (e.g., scenarios 402, 410, 420, 422, 430, 432) includes a ground 401. The ground 401 may be a floor surface of the data center environment 100. For example, FIG. 4a shows a movable barrier 412 that prevents individuals such as individual 408 from entering the zone 404 and allows the AV 110 to provide items such as servers and/or server parts to the individual 408. For instance, initially in scenario 402, the AV 110 may be operating within zone 404 and an individual 408 may be located within zone 406. The movable barrier 412 may prevent the individual 408 from entering the zone 404. In other words, zone 404 may only be accessible to the robots such as the AV 110. As mentioned above, this may be beneficial to prevent individuals from gaining access to confidential and/or sensitive information stored in servers within the zone 404. In some instances, one or more of these servers may require maintenance. Accordingly, the AV 110 may pick up or retrieve (e.g., by using the server maintenance system 118) a server and provide the server to the individual 408 using the movable barrier 412. In scenario 410, the movable barrier 412 may actuate and rotate such that the individual 408 may retrieve the server and/or perform maintenance on the server. As such, the AV 110 may service and/or repair the servers within zone 404 of the data center environment 100 using the movable barrier 412.

To put it another way, at block 302, the AV 110 may receive a task requiring a particular server be repaired. At block 304, the AV 110 may navigate to retrieve the server and provide it to the movable barrier 412. At blocks 306 and 308, the AV 110 may bypass the movable barrier by placing the server within an opening provided by the movable barrier 412. The movable barrier 412 may rotate and provide the server to the individual 408 within zone 406. Therefore, the individual 408 might not be required to enter zone 404 as the AV 110 may be automated to repair and/or replace servers within the zone 406. In some variations, the AV 110 may communicate with the movable barrier 412 such as by providing instructions to actuate the movable barrier 412 in order for the individual 408 to access the server.

In some variations, the movable barrier 412 may include an opening for an entire server rack. For example, the opening may be a large rotating cylinder. The AV 110 may pick up the entire server rack and place the server rack in the opening. Then, the movable barrier 412 may rotate the entire server rack to the other side for maintenance.

In some examples, the movable barrier 412 may be an airlock. For example, the airlock 412 may prevent the individual 408 from entering the zone 404.

FIG. 4b shows a movable barrier 424 that prevents/allows individuals such as individual 408 and/or AVs 110 from entering the zone 428. For instance, initially in scenario 420, the AV 110 and the individual 408 may be within zone 426 and seeking to enter zone 428. The movable barrier 424 may permit the individual 408 to enter zone 428, but may prevent the AV 110 from entering zone 428. For example, as mentioned previously, the zone 428 may include servers owned/managed by an enterprise organization. The enterprise organization seek to prevent access to the zone 428. However, in some instances, the AV 110 may need to navigate through the zone 428 to get to a destination within the data center environment 100. As such, the AV 110 may provide identification information and based on verifying the identification information, the movable barrier 424 to allow access to the AV 110. For instance, in scenario 422 and after granting access to the AV 110, the movable barrier 414 is moved in such a way to permit the AV 110 to access zone 428. As such, the AV 110 is able to navigate through zone 428 to reach a destination.

To put it another way, at block 302, the AV 110 may receive a task requiring a particular server be repaired or requiring the AV 110 to move to a new location within the data center environment 100. At block 304, the AV 110 may navigate to the destination. While navigating to the destination and at block 306, the AV 110 may encounter a movable barrier 424. Based on encountering the movable barrier 424 and at block 308, the AV 110 may perform a procedure to bypass the movable barrier 424. For example, the AV 110 may provide identification information to a second device. The second device may be the movable barrier 424, the global data center control system 120, and/or the local data center control system 122. For instance, the movable barrier 424 may include one or more processors, memory, and a network interface. The movable barrier 424 may receive the identification information from the AV 110 and based on the identification information, the movable barrier 424 may grant or restrict access to the zone 428. If the movable barrier 424 grants access to the AV 110, then scenario 422 and the movable barrier 424 may move aside to allow the AV 110 into the zone 428.

In some instances, the second device may be the local data center control system 122. For example, an enterprise organization may own and/or operate zone 428 as well as the local data center control system 122. The local data center control system 122 may grant or deny access to zone 428 using the movable barrier 424. For example, based on receiving identification information from the AV 110, the local data center control system 122 may grant the AV 110 access to zone 428. As mentioned above, the data center environment 100 may include numerous zones and each zone may be associated with a different enterprise organization. Each enterprise organization may have a local data center control system 122. Therefore, while navigating to a destination, the AV 110 may provide identification information to numerous local data center control systems 122 to gain access to their respective zones.

In some examples, the second device may be the global data center control system 120. For example, an enterprise organization may own and/or operate zone 428. However, the enterprise organization may not own, manage, and/or operate a local data center control system 122 (e.g., the enterprise organization may only include a few servers within the environment 100 and might not require an independent local data center control system 122). Therefore, the global data center control system 120 may perform the functionalities of the local data center control system 122. For example, based on receiving identification information from the AV 110, the global data center control system 120 may grant the AV 110 access to zone 428.

In some instances, the second device may store information indicating a time period that the AV 110 is within the zone. For instance, the zone 428 may include two or more movable barriers and the AV 110 may use one movable barrier to enter the zone 428 and one to exit the zone 428. Based on information from the two movable barriers, the second device may determine an amount of time the AV 110 was within the zone 428. The second device may use this information to ensure the AV 110 did not access any confidential and/or sensitive information from the servers within the zone 428.

FIG. 4c shows a movable barrier 434 that prevents AVs such as AV 110 from entering the zone 438. For instance, initially in scenario 430, the AV 110 may be operating within zone 436 and an individual 408 may be located within zone 438. The movable barrier 434 may prevent the AV 110 from entering the zone 438. For instance, the zone 438 may be a break-room for people to rest and relax. The AV 110 may have accidentally navigated there and as such, the AV 110 may be prevented from entering the zone 438 by the movable barrier 434. However, the individual 408 may enter or exit the zone 438 using the movable barrier 434. For example, in scenario 432, the movable barrier 434 may lift up and the individual 408 may exit zone 438 and enter zone 436. Even though the movable barrier 434 lifts up, the AV 110 might still not be able to enter zone 438.

To put it another way, at block 302, the AV 110 may receive a task requiring a particular server be repaired. At block 304, the AV 110 may navigate to retrieve the server. At block 306, the navigation may have accidentally led the AV 110 to the movable barrier 434. Accordingly, at block 308, the AV 110 may bypass the movable barrier by determining a new route to the destination that does not involve entering zone 438. Then, the AV 110 may use the new route to navigate to the new destination.

In some examples, at block 304 and during navigating from the initial location to the new location, the AV 110 may use one or more identifiers located within the data center environment 100 to determine a location of the AV 110 within the data center environment 100. A desired or intended path of the AV 110 between the initial and new locations may be predetermined or predefined for the AV 110, or may be determined by the AV 110 or another control authority based on the current location of the AV 110, other traffic in the area, and the like. The location identifiers (e.g., machine readable labels) within the data center environment 100 may include, but are not limited to, magnetic strips within the floor, stargazing (i.e., printed patterns on roof of data center environment 100), unique images, LIDAR signals, RF signals, RFID tags, and/or wireless signals. The location identification device 116 may use one or more of the identifiers to determine a location of the AV 110 within the data center environment 100.

In some instances, the identifier may be a device such as a dongle that is attached to a server rack. The device may produce/emit an RF frequency that is detectable by the location identification device 116. For example, a task may be for the AV 110 to assist in installing a new server rack. The new server rack may include a device that emits an RF frequency such that the AV 110 may be able to identify the server rack.

In some variations, more than two types of identifiers (e.g., RF signals and/or images) may be used by the location identification device 116 to identify the location of the AV 110. In some instances, the AV 110 may communicate with the global data center control system 120 to determine the AV's 110 location within the environment 100. For example, the AV 110 may provide the information from the identifiers to the global data center control system 120. The global data center control system 120 may provide the location within the data center environment 100 back to the AV 110. In other instances, the AV 110 may determine, based on the information from the identifiers, the location of the AV 110 locally. For instance, the AV 110 may compare the information from the identifiers with information from memory (e.g., memory 212) to determine the location of the AV 110. For example, the memory 212 may include a map or database with a plurality of identifiers and their associated locations within the data center environment 100. The AV 110 may compare the information from the identifiers (e.g., an RF signal) with the plurality of identifiers within the memory 212 to determine the location of the AV 110.

In some examples, the AV 110 may reach the new location and perform the received task, which may include repairing and/or replacing a server within a server rack. The server maintenance system 118 may be used to locate the server to be repaired/replaced as well as assisting in repairing/replacing the server. For example, the AV 110 may receive the task indicating a particular location of the server, including a height of a server, within the data center environment 100. The AV 110 may navigate to the location, but might not have the necessary capabilities to reach the server (e.g., the server is at a height that is inaccessible to the AV 110). As such, the AV 110 may use the server maintenance system 118 to reach the server. Additionally, and/or alternatively, the AV 110 may be able to reach the location, but might not have the capabilities of locating the server. For instance, a server rack may include a plurality of servers and the AV 110 might not have the capability to locate a particular server within the server rack especially if all the servers appear identical. Accordingly, the AV 110 may use the server maintenance system 118 to determine the server identified by the task in order to repair/replace it. In some instances, the server maintenance system 118 may include one or more robotic components and may use registration to determine the server identified by the task. For example, the server may include registration markers that are identifiable by the server maintenance system 118.

Figure 5:
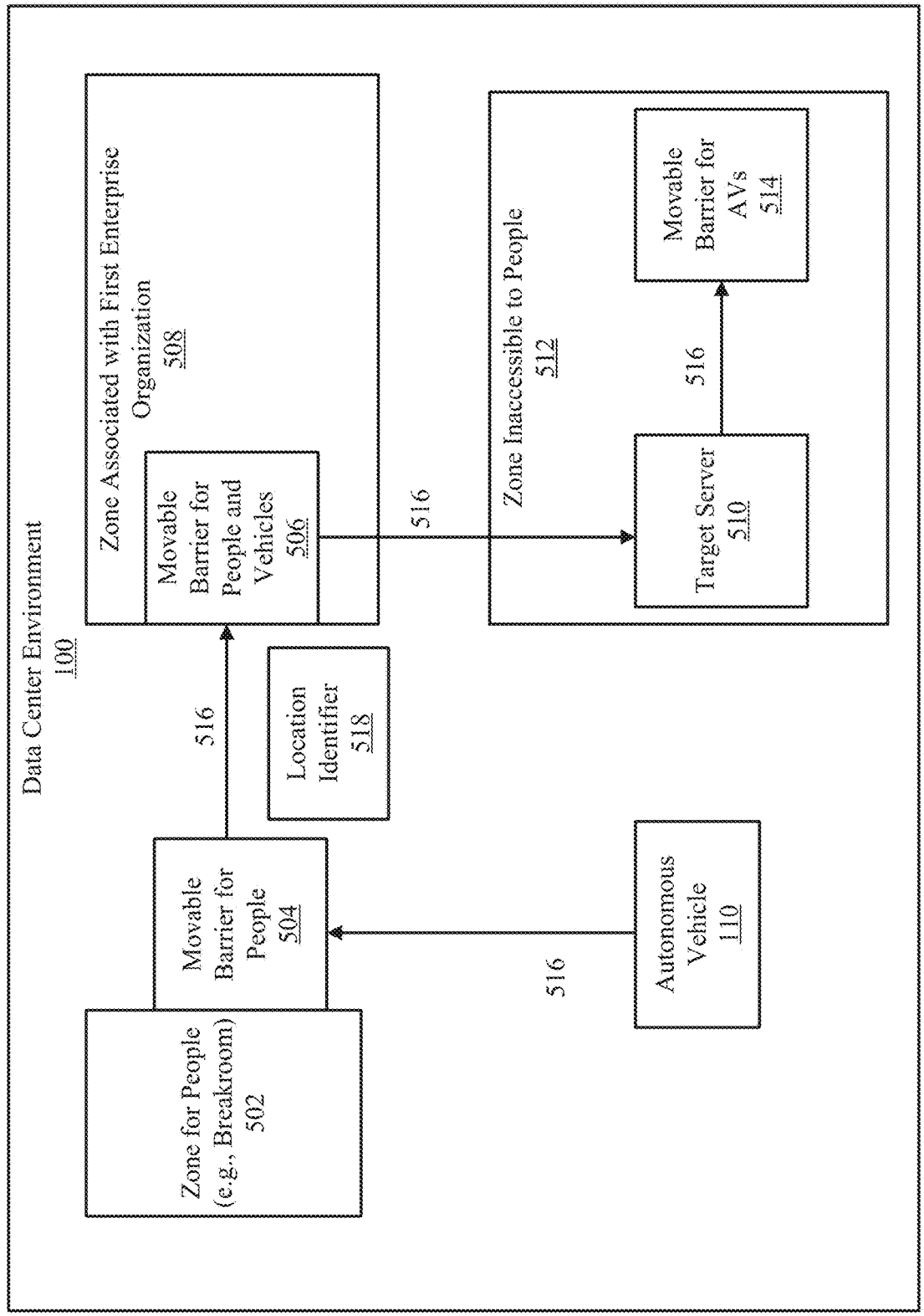
FIG. 5 depicts an autonomous vehicle navigating within the data center according to one or more embodiments of the present disclosure.

FIG. 5 depicts an AV 110 navigating within the data center environment 100 according to one or more embodiments of the present disclosure. For example, the AV 110 may receive a task to fix a target server 510. The AV 110 may determine a path (e.g., path 516) to reach the target server 510. The path may include navigating through one or more movable barriers that may prevent/permit the AV 110 to gain access to one or more zones associated with an enterprise organization, which is described above. After determining the path 516, the AV 110 may navigate along path 516 to reach the target server 510 and along the path 516, the AV 110 may encounter movable barriers such as barriers 504, 506, and 514. For example, the AV 110 may encounter a movable barrier for people 504. In other words, the movable barrier 504 may be similar to movable barrier 434 in FIG. 4c. For instance, the movable barrier 504 may be to prevent the AV 110 from entering the zone 502 that is specifically for people (e.g., a breakroom). As such, the AV 110 may perform a process to bypass the movable barrier 504 and continue on path 516.

Next, the AV 110 may encounter the location identifier 518. The AV 110 may use the location identification device 116 to determine its location within the data center environment 100. Following this, the AV 110 may seek to enter the zone 508 that is associated with a first enterprise organization. The movable barrier 506 may initially prevent access to zone 508. As described above, the AV 110 may provide identification information and may then gain access to zone 508. Accordingly, the AV 110 may bypass the movable barrier 506 and proceed along the path 516.

Then, the AV 110 may enter a zone 512 that is inaccessible to people. The target server 510 may be within this zone and the AV 110 may eventually reach the target server 510. The AV 110 may use the server maintenance system 118 to identify the server 510 within the server rack/zone 512 and/or perform maintenance on the server 510. For example, the AV 110 may retrieve the target server 510 and proceed along the path to the movable barrier for AVs 514. The movable barrier 514 may be similar to movable barrier 412 shown in FIG. 4a. For example, the AV 110 may place the server 510 within the opening of the movable barrier 514. The movable barrier 514 may rotate and provide access to a mechanic or technician such that they are able to fix the server 510. Additionally, and/or alternatively, the movable barrier 514 may provide a new server to the AV 110. In other words, the AV 110 may replace the target server 510 with the new provided server from the movable barrier 514.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. For example, the various embodiments of the kinematic, control, electrical, mounting, and user interface subsystems can be used interchangeably without departing from the scope of the invention. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A system for servicing a data center using an autonomous vehicle (AV), comprising:
the AV, wherein the AV is configured to:
receive a task to perform within the data center, wherein the data center comprises a plurality of servers associated with a plurality of enterprise organizations, a first type of movable barrier indicating access to a zone accessible by the AV, a second type of movable barrier indicating a zone that is inaccessible by the AV, and a third type of movable barrier that receives an item of the task from the AV;
navigate from an initial location within the data center to a new location within the data center along a path extending through a portion of the data center, the path being determined automatically; and
while navigating the path and in response to encountering one of the movable barriers disposed along the path, performing a procedure to bypass the movable barrier wherein performing the procedure comprises:
determining a response based on whether the movable barrier is the first type of movable barrier, the second type of movable barrier, or the third type of movable barrier.

2. The system of claim 1, wherein the task is to service a server, from the plurality of servers, and wherein the new location within the data center is a location of the server within the data center.

3. The system of claim 2, wherein the AV is configured to place the server within an opening of a second movable barrier, and wherein the system further comprises:
the second movable barrier, wherein the second movable barrier prevents any individual from entering a zone of the data center, and wherein the second movable barrier is configured to:
actuate the opening from a first position to a second position, wherein the server is accessible to an individual in the second position without the individual entering the zone.

4. The system of claim 3, wherein the second movable barrier is further configured to:
receive a replacement server within the opening; and
actuate the opening from the second position back to the first position, wherein the replacement server is accessible to the AV in the first position.

5. The system of claim 2, wherein the movable barrier is the second type of movable barrier, and wherein the response comprises:
determining a new path to the new location; and
navigating the AV to the new location using the new path.

6. The system of claim 2, wherein the response comprises:
providing, to a second device, identification information associated with the AV, and wherein the system further comprises:
the movable barrier, wherein the movable barrier is located within a zone of the data center that is managed by an enterprise organization, wherein the movable barrier prevents unauthorized access to servers, from the plurality of servers, within the zone, and wherein the movable barrier is configured to:
permit the AV access to the zone based on the identification information.

7. The system of claim 6, wherein the system further comprises:
the second device, wherein the second device is a local data center control system and configured to:
receive the identification information associated with the AV;
grant the AV access to the zone based on the identification information; and
provide instructions to the movable barrier permitting the AV access to the zone.

8. The system of claim 7, wherein the local data center control system is further configured to:
log an amount of time the AV is within the zone based on a second movable barrier associated with the zone and providing instructions to the movable barrier permitting the AV access to the zone.

9. The system of claim 6, wherein the second device is the movable barrier.

10. The system of claim 2, wherein the AV is configured to navigate from the initial location to the new location based on:
receiving information associated with one or more identifiers located within the data center; and
comparing the one or more identifiers with identifier information in memory of the AV to determine a location of the AV within the data center.

11. The system of claim 10, wherein the information associated with the one or more identifiers comprises a radio frequency (RF) signal and an identification image, and wherein the AV is configured to compare the one or more identifiers by comparing the RF signal and the identification image with RF signals and identification images in the memory.

12. The system of claim 2, wherein the system further comprises:
a server maintenance system operatively coupled to the AV, wherein the server maintenance system is configured to:
in response to determining the AV is located at the location of the server to be serviced, retrieve the server from a server rack.

13. A method for servicing a data center using an autonomous vehicle (AV), comprising:
receiving, by the AV, a task to perform within the data center, wherein the data center comprises a plurality of servers associated with a plurality of enterprise organizations, a first type of movable barrier indicating access to a zone accessible by the AV, a second type of movable barrier indicating a zone that is inaccessible by the AV, and a third type of movable barrier that receives an item of the task from the AV;
navigating, by the AV, from an initial location within the data center to a new location within the data center along a path extending through a portion of the data center, the path being determined automatically; and
while navigating the path and in response to encountering one of the movable barriers disposed along the path, performing, by the AV, a procedure to bypass the movable barrier wherein performing the procedure comprises:
determining a response based on whether the movable barrier is the first type of movable barrier, the second type of movable barrier, or the third type of movable barrier.

14. The method of claim 13, wherein the task is to service a server, from the plurality of servers, and wherein the new location within the data center is a location of the server within the data center.

15. The method of claim 14, wherein the movable barrier is the second type, and wherein the response comprises:
determining a new path to the new location; and
navigating the AV to the new location using the new path.

16. The method of claim 14, wherein the response comprises providing, by the AV and to a second device, identification information associated with the AV,
wherein the movable barrier is located within a zone of the data center that is managed by an enterprise organization, wherein the movable barrier prevents unauthorized access to servers, from the plurality of servers, within the zone, and wherein the AV is granted access to the zone based on providing the identification information.

17. The method of claim 16, further comprising:
receiving, by the second device, the identification information associated with the AV;
granting, by the second device, the AV access to the zone based on the identification information; and
providing, by the second device, instructions to the movable barrier permitting the AV access to the zone.

18. The method of claim 16, wherein the second device is a local data center control system, and wherein the method further comprises:
logging, by the local data center control system, an amount of time the AV is within the zone based on a second movable barrier associated with the zone and providing instructions to the movable barrier permitting the AV access to the zone.

19. The method of claim 16, wherein the second device is the movable barrier.

20. A non-transitory computer-readable medium having processor-executable instructions stored thereon, wherein the processor-executable instructions, when executed by one or more controllers, facilitate:
receiving a task to perform within a data center, wherein the data center comprises a plurality of servers associated with a plurality of enterprise organizations, a first type of movable barrier indicating access to a zone accessible by the AV, a second type of movable barrier indicating a zone that is inaccessible by the AV, and a third type of movable barrier that receives an item of the task from the AV;
navigating an AV from an initial location within the data center to a new location within the data center along a path extending through a portion of the data center, the path being determined automatically; and
while navigating the path and in response to encountering one of the movable barriers disposed along the path, performing a procedure to bypass the movable wherein performing the procedure comprises:

determining a response based on whether the movable barrier is the first type of movable barrier, the second type of movable barrier, or the third type of movable barrier.

21. The system of claim 1, wherein the response comprises:
based on the movable barrier being the first type, performing a first procedure to bypass the first movable barrier such that the AV can continue navigating along the path by providing identification information.

* * * * *